Sept. 15, 1953 F. P. LEWIS 2,651,853
ANIMAL BOOT WITH ADHESIVE TAPE SECURING MEANS
Filed Nov. 29, 1951
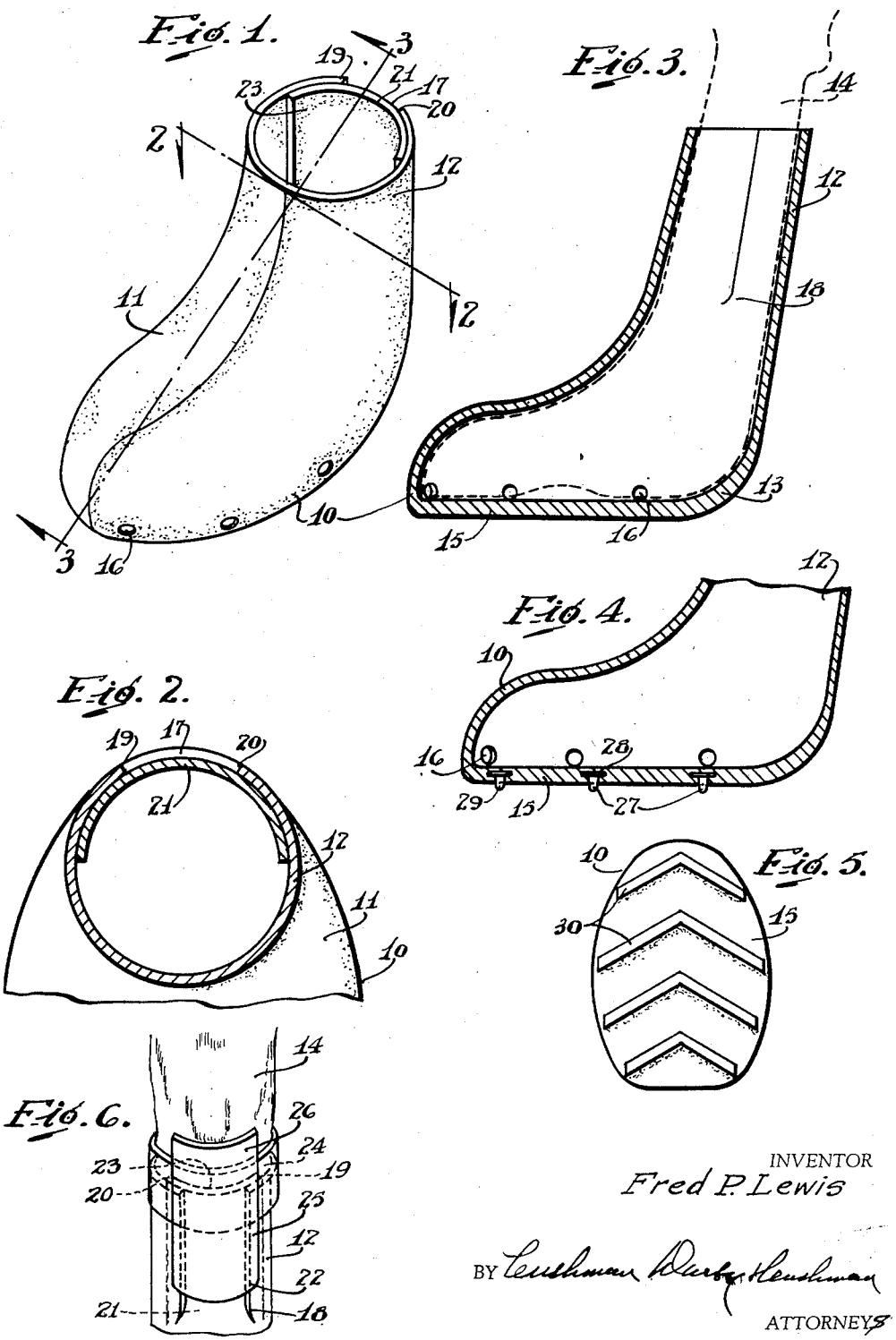
INVENTOR
Fred P. Lewis
BY Lenshman Darby Henshman
ATTORNEYS Patented Sept. 15, 1953

2,651,853

UNITED STATES PATENT OFFICE 2,651,853

ANIMAL BOOT WITH ADHESIVE TAPE SECURING MEANS

Fred Peter Lewis, Enid, Okla.

Application November 29, 1951, Serial No. 258,947

1 Claim. (Cl. 36—2.5)

The present invention relates to an improved animal boot or shoe. Heretofore, in protective devices for animals such as dog boots, difficulty has been encountered in providing means for firmly but detachably securing the boot to the leg of the dog, with the result that the boot frequently slips down on the leg or is attached in an uncomfortable manner so as to irritate the dog.

Accordingly, an important object of the present invention is to provide a simple, efficient, and economical dog boot made of suitable durable and waterproof flexible material and which includes a tubular leg portion having a vertical slot so as to provide spaced adjustable opposed sides arranged to conform to the shape of the leg of the animal to which the boot is applied. Additionally, the flap or tongue which is preferably formed of the same material as the boot, is connected to the bottom of the slot and is of greater width than the slot so as to overlap and engage the opposed inner sides of the boot. Thus the leg portion is provided with flexible adjustable means that will firmly engage and comfortably fit the legs of dogs of different sizes and shapes.

Other objects and advantages of the invention will become apparent from the following description when taken in conjunction with the accompanying claims and drawings.

Referring to the drawings in which are shown several preferred embodiments of the invention:

Figure 1 is a perspective view of a flexible animal boot constructed in accordance with the present invention.

Figure 2 is a sectional view taken substantially along the line 2—2 of Figure 1.

Figure 3 is a sectional view taken substantially along the line 3—3 of Figure 1.

Figure 4 is a longitudinal detailed sectional view of a modified form of the invention.

Figure 5 is a detailed bottom plan view of a modified form of sole that may be associated with the animal boot; and Figure 6 is a detailed rear end view of an animal leg showing the boot applied and means for securing the boot to the leg of the animal.

Referring to the drawings in which like numerals indicate like parts in the several figures, 10 designates a soft and pliable boot or shoe formed of any suitable flexible and durable material such as moulded rubber or the like so as to provide a foot portion 11 and an integral leg portion 12 which extends upwardly from the rear or heel 13 (Fig. 3) of the foot portion. The leg portion 12 is of tubular shape so as to conform to the shape of the leg 14 of an animal, such as a hunting dog, to which the boot is to be applied.

The foot portion 11 of the boot is formed with a reinforced flat sole 15 which is preferably thicker than the leg portion 12 so as to withstand the wear and tear to which a device of this character is normally subjected. The foot portion 11 above the sole may be provided with spaced air ventilating openings 16 for maintaining the interior of the boot and the foot of the animal dry.

The tubular leg portion 12 is of such a length as to extend upwardly a sufficient distance to firmly engage the leg of the animal. In order that the boot may be applied to animals having legs of different sizes and shapes, the tubular leg portion 12 is preferably formed with a wide vertically disposed elongated slot 17 (Fig. 1) formed in the rear of the tubular member 12 and extending from the points such as 18 (Fig. 3) above the foot portion 11 to the outer or upper end of the tubular portion 12 so as to form the spaced vertical side edges 19 and 20 in the opposed walls of the slot 17. A flexible flap or tongue 21 preferably formed of the same material as the boot 10, is suitably connected to the tubular leg portion 12 at the bottom 22 of the slot 17 (Fig. 6). As shown, the boot 10 is made of rubber and the flap 21 being of the same material may be vulcanized thereto and is of such width and length as to form the unattached or free portion 23 which overlaps the opposed vertical sides 19 and 20 and completely closes the slot 17 so as to provide adjustable means that insures the leg portion being arranged to properly and firmly fit the legs of animals of different sizes and shapes.

Assuming that the boot is applied to the foot 14 of a dog (Fig. 6), when the tubular leg portion is initially applied the curved flap 21 and the overlapped flexible sides 19 and 20 will loosely engage the leg of the animal. A strip of suitable adhesive tape 24 is then circumferentially applied to the upper edge of the tubular portion 12 of the boot so as to cause the sides 19 and 20 and the flap 21 to be moved into snug or tight fitting engagement with the leg 14 of the dog. Thus the circumferentially disposed tape 24 provides means for preventing pebbles and other foreign matter from entering the boot between the leg of the animal and the leg portion of the boot. In order to prevent the boot from slipping down on the leg 14 a second or auxiliary strip of adhesive tape 25 is connected to the rear of the leg portion 12 so as to overlap the circumferentially disposed tape 24 and is provided with an upwardly extending portion 26 (Fig. 6) that adhesively engages and is secured to the leg 14 of the dog. Thus, it will be seen that economical and efficient means are provided for insuring the boot to be firmly yet detachably connected to the leg of the dog in such a manner that the boot will not slip down or come off of the dog's foot.

In the modified form of the invention shown in Figure 4 the flexible boot or shoe is substantially similar to the form previously described, however, the sole 15 is shown in this form of the invention being provided with spaced spikes 27 that may be imbedded in the sole as at 28 and that have ground engaging pointed end portions 29 extending downwardly and outwardly therefrom.

In the modified form of the invention shown in Figure 5 the sole 15 of the boot 10 is shown provided with substantially V-shaped depending moulded rubber ribs 30 so as to prevent slipping and increase the traction surface of the boot.

Manifestly, the size and shape of the boot 10 may be varied in accordance with the particular purpose and use to which it is applied, and the boot may be formed of either light or heavy duty material so that when attached to the legs of a hunting dog the danger of the dog's foot being injured by sandburrs, or the like, is eliminated. Additionally, the reinforced sole of the boot may be provided with spikes or rubber ribs so as to prevent the dog from slipping on ice or other smooth surfaces. The adhesive tape means insures the boot being firmly and comfortably attached to the leg of the animal without danger of being loose or falling off.

It will be understood that the forms of the invention shown and described are merely illustrative of preforming embodiments and that such changes may be made as come within the scope of the following claim.

I claim:

An animal boot of flexible durable rubberized material including a foot portion and a tubular leg portion, said foot portion having a sole, said leg portion projecting upwardly from the foot portion, said leg portion at its rear having a wide elongated vertical slot extending to its upper end to provide spaced adjustable opposed sides arranged to conform to the shape of the leg of an animal, a flexible flap vulcanized to the leg portion at the bottom of the said slot and having a free unattached portion of greater width than the slot so as to completely close the slot and overlap the opposed sides thereof, and means for connecting the boot to the animal including a strip of circumferentially disposed adhesive tape adapted to hold the sides of the slotted leg portions and the flap in close engagement with the leg of the animal, and a vertically disposed adhesive strip connected to the leg portion of the boot and having an extension for attachment to the leg of the animal.

FRED PETER LEWIS.

References Cited in the file of this patent

UNITED STATES PATENTS

| Number | Name | Date |
|---|---|---|
| 645,467 | Fowler | Mar. 13, 1900 |
| 1,172,770 | Deutsch | Feb. 22, 1916 |
| 1,259,689 | Waterman | Mar. 19, 1918 |
| 2,313,577 | Plant | Mar. 9, 1943 |
| 2,424,172 | Huddleston | July 15, 1947 |
| 2,446,371 | Jones | Aug. 3, 1948 |

FOREIGN PATENTS

| Number | Country | Date |
|---|---|---|
| 722,098 | France | Dec. 28, 1931 |